(12) United States Patent
Lee (10) Patent No.: US 9,227,655 B2
(45) Date of Patent: Jan. 5, 2016

(54) ELECTRICAL POWER ASSISTED STEERING DEVICE

(71) Applicant: KWANG YANG MOTOR CO., LTD., Kaohsiung (TW)

(72) Inventor: Yao-Cheng Lee, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

(21) Appl. No.: 14/573,378

(22) Filed: Dec. 17, 2014

(65) Prior Publication Data
US 2015/0183454 A1   Jul. 2, 2015

(30) Foreign Application Priority Data
Jan. 2, 2014   (TW) ............................. 103100016 A (51) Int. Cl.
*B62D 5/04* (2006.01)
*B62D 6/10* (2006.01)

(52) U.S. Cl.
CPC ............ *B62D 5/0409* (2013.01); *B62D 5/0481* (2013.01); *B62D 6/10* (2013.01)

(58) Field of Classification Search
CPC ....... B62D 5/0409; B62D 5/0481; B62D 6/10
USPC ...................... 180/446, 444, 443; 74/388 PS; 73/862.335
See application file for complete search history.

(56) References Cited

U.S. PATENT DOCUMENTS

| 6,860,159 | B2 * | 3/2005 | Jin | ........................ | G01D 5/2013 |
| | | | | | 73/862.331 |
| 2002/0020578 | A1 * | 2/2002 | Kurokawa | ............ | B62D 5/0409 |
| | | | | | 180/444 |
| 2002/0056588 | A1 * | 5/2002 | Kuze | .................... | B62D 5/0409 |
| | | | | | 180/444 |
| 2012/0264524 | A1 * | 10/2012 | Nakagawa | ........... | B62D 5/0409 |
| | | | | | 464/73 |

* cited by examiner

*Primary Examiner* — Anne Marie Boehler
*Assistant Examiner* — Marlon Arce
(74) *Attorney, Agent, or Firm* — Rabin & Berdo, P.C.

(57) ABSTRACT

An electrical power assisted steering device has a lower shaft, an upper shaft module, a pre-torsion module and a torsion bar. The upper shaft module has an upper shaft, a detecting unit mounted around the upper shaft, and an assembling space annularly formed between the detecting unit and the pushing portions. The pre-torsion module is mounted in the assembling space and has a maintaining unit mounted around the upper shaft and in the assembling space, multiple sliding blocks mounted in the maintaining unit and respectively abutting the upper shaft, and multiple springs mounted in the maintaining unit and respectively abutting between the maintaining unit and the sliding blocks. The torsion bar is connected between the upper shaft and the lower shaft.

8 Claims, 9 Drawing Sheets

ELECTRICAL POWER ASSISTED STEERING DEVICE

BACKGROUND OF THE INVENTION

1. Field of the Invention

The present invention relates to a steering device, and more particularly to an electrical power assisted steering device for a vehicle.

2. Description of Related Art

A steering device of a vehicle is mounted between a steering wheel and wheels of the vehicle. The steering device has an upper shaft, a lower shaft engaged with the upper shaft by threads, and a detecting unit. The upper shaft is connected with the steering wheel. The lower shaft is connected with the wheels. An end of the lower shaft opposite to the upper shaft is engaged with an upper rotor of the detecting unit. When the lower shaft is driven to rotate by the upper shaft, the upper rotor of the detecting unit is also driven to rotate. Then, a lower rotor of the detecting unit can detect a rotating angle of the upper rotor, and then a motor is driven to operate. The motor can drive the upper shaft and the lower shaft to rotate in the same direction to provide a steering assist for a user.

However, the upper shaft and the lower shaft are engaged with each other by threads, and the threads may be worn and damaged after use for a period. When the threads between the upper shaft and the lower shaft are worn or damaged, a torsion force formed by the steering device may be changed, and the operation of the steering wheel for the user may be badly affected.

SUMMARY OF THE INVENTION

The main objective of the present invention is to provide an electrical power assisted steering device for a vehicle.

The electrical power assisted steering device is mounted in a vehicle and has a lower shaft, an upper shaft module, a pre-torsion module, a torsion bar and a sensing module.

The sensing module has an upper rotor and a lower rotor mounted under the upper rotor.

The lower shaft is engaged with the lower rotor.

The upper shaft module is mounted above the lower shaft and has an upper shaft, a detecting unit mounted around the upper shaft and engaged with the upper rotor of the sensing module, multiple pushing portions formed in the upper shaft, and an assembling space annularly formed between the detecting unit and the pushing portions.

The pre-torsion module is mounted in the assembling space and has a maintaining unit mounted around the upper shaft and in the assembling space, multiple sliding blocks mounted in the maintaining unit and respectively abutting the pushing portions, and multiple springs mounted in the maintaining unit and respectively abutting between the maintaining unit and the sliding blocks.

The torsion bar is connected between the upper shaft and the lower shaft.

Other objectives, advantages and novel features of the present invention will become more apparent from the following detailed description when taken in conjunction with the accompanying drawings.

DETAILED DESCRIPTION OF PREFERRED EMBODIMENT

Figure 1:
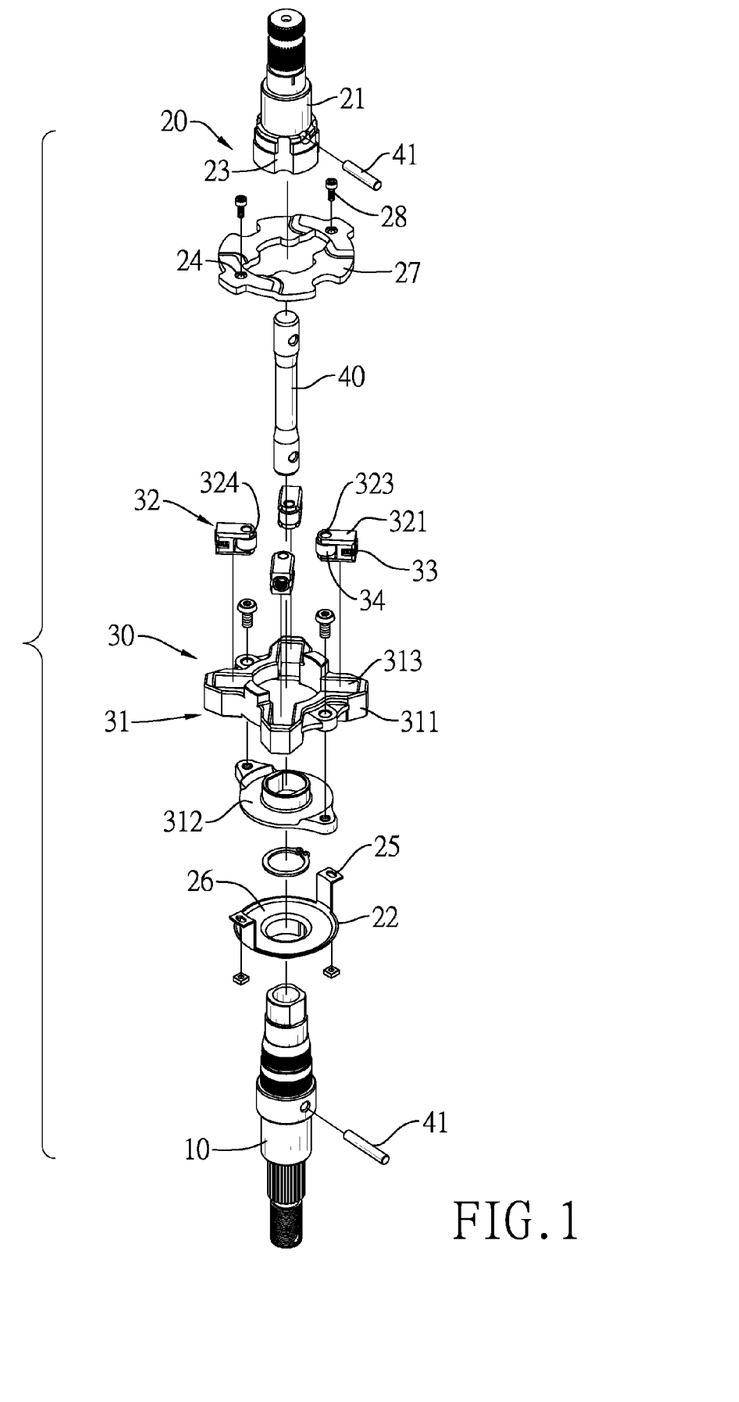
FIG. 1 is an exploded perspective view of a preferred embodiment of an electrical power assisted steering device in accordance with the present invention.
Figure 2:
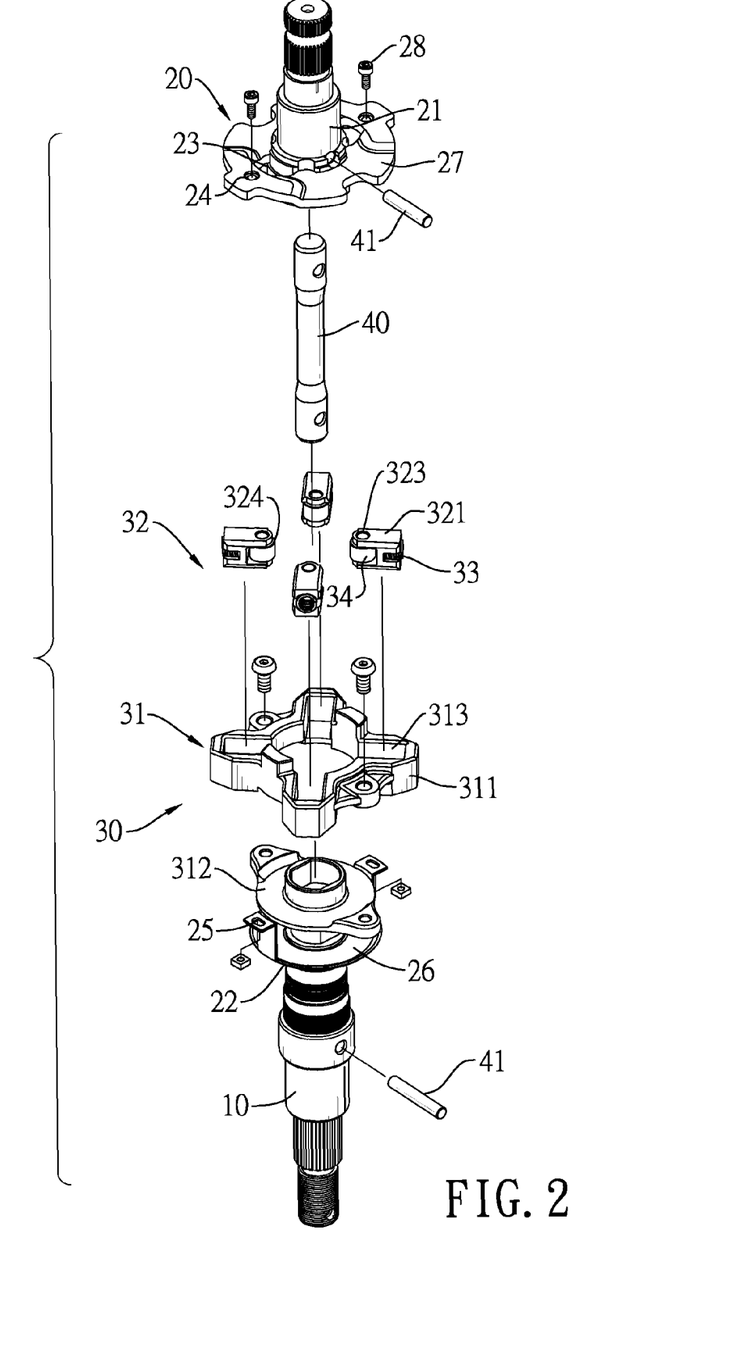
FIG. 2 is a partially exploded perspective view of the electrical power assisted steering device of FIG. 1.

With reference to FIGS. 1 and 2, a preferred embodiment of an electrical power assisted steering device for a vehicle in accordance with the present invention has a lower shaft 10, an upper shaft module 20, a pre-torsion module 30, a torsion bar 40 and a sensing module 60.

Figure 8:
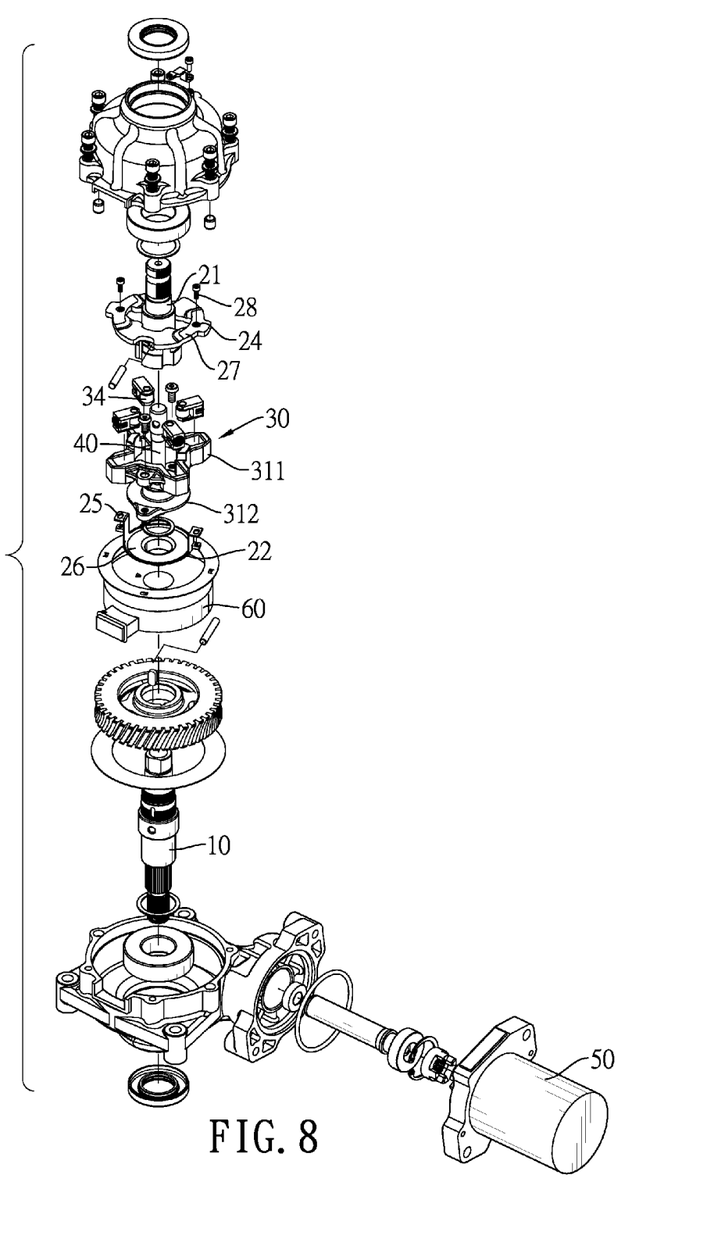
FIG. 8 is an exploded perspective view of the electrical power assisted steering device in FIG. 1 mounted on a sensing module and a motor of a vehicle.

Further with reference to FIG. 8, the lower shaft 10 is connected with a wheel of the vehicle and is engaged with the sensing module 60, wherein the sensing module 60 is mounted between the wheel and a steering wheel of the vehicle. The sensing module 60 has an upper rotor and a lower rotor mounted under the upper rotor, and the lower shaft 10 is engaged with the lower rotor.

Figure 6:
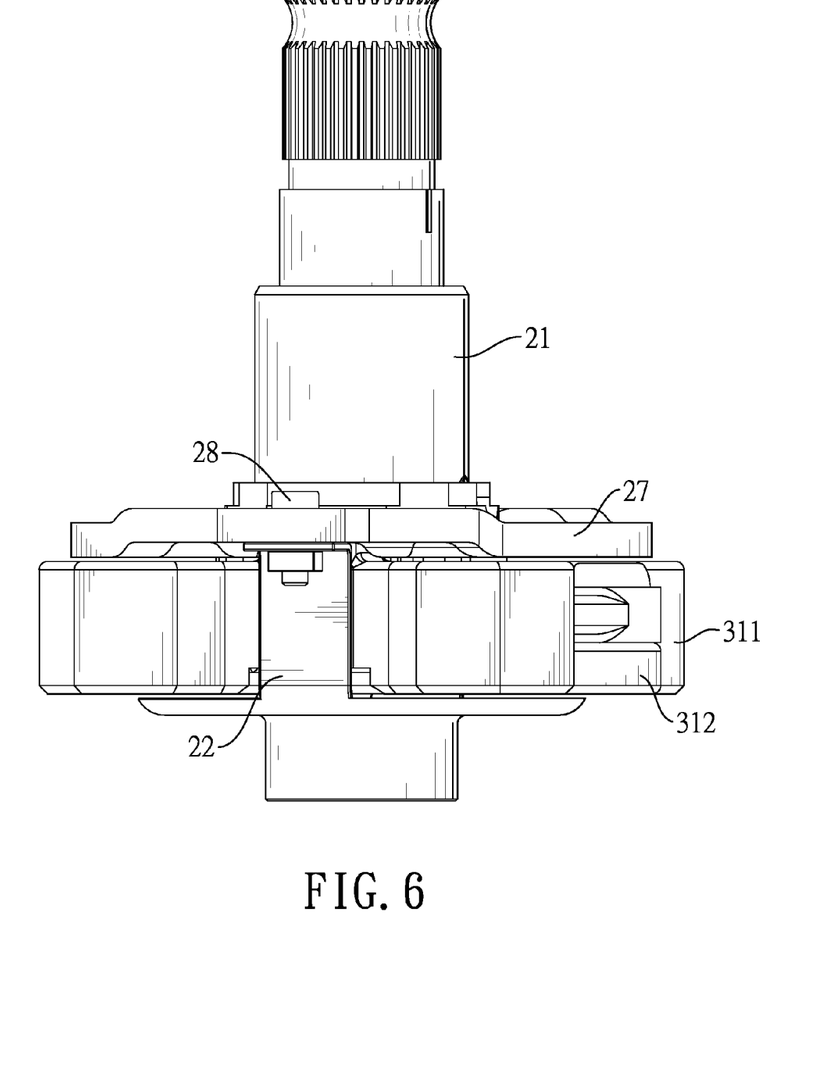
FIG. 6 is a side view of the electrical power assisted steering device of FIG. 5.

Further with reference to FIG. 6, the upper shaft module 20 is mounted above the lower shaft 10 and has an upper shaft 21, a detecting unit 22, multiple pushing portions 23, multiple first adjusting portions 24, multiple second adjusting portions 25, and an assembling space 26. The upper shaft 21 is connected with the steering wheel. A bottom of the detecting unit 22 is engaged with the upper rotor of the sensing module 60 and is rotatably mounted around the upper shaft 21 to allow the detecting unit 22 to rotate slightly relative to the upper shaft 21. The pushing units 23 are formed on the upper shaft 21 longitudinally at intervals and are adjacent to a bottom of the upper shaft 21. The first adjusting portions 24 are formed in the upper shaft 21 and are above the pushing portions 23. The second adjusting portions 25 are formed in the detecting unit 22 and are respectively aligned with the first adjusting portions 24. The assembling space 26 is annularly formed between the detecting unit 22 and the pushing portions 23.

Preferably, the upper shaft 21 further has an adjusting board 27 provided for limiting a steering angle of the steering wheel. The first adjusting portions 24 are circular holes and are formed in the adjusting board 27. The second adjusting portions 25 are curved holes. The upper shaft module 20 further has multiple combining units 28 respectively inserted through and combined with the first adjusting portions 24 and the second adjusting portions 25, such that the detecting unit 22 can be rotatably mounted around the upper shaft 21 to allow the detecting unit 22 to rotate slightly relative to the upper shaft 21. Alternatively, the first adjusting portions 24 are curved holes, and the second adjusting portions 25 are circular holes, such that the combining units 28 can also be inserted through the first adjusting portions 24 and the second adjusting portions 25, and the detecting unit 22 can also be rotatably mounted around the upper shaft 21 to allow the detecting unit 22 to rotate slightly relative to the upper shaft 21.

With reference to FIGS. 1 to 3, 5, 6, the pre-torsion module 30 is mounted around the upper shaft 21, is mounted in the assembling space 26 between the adjusting board 27 and the detecting unit 22, and has a maintaining unit 31, multiple sliding blocks 32 and multiple springs 33.

The maintaining unit 31 is mounted in the assembling space 26 and has a body 311, a base 312 and multiple recesses 313. The body 311 is annular. The base 312 is mounted on a bottom of the body 311 and is mounted around a top of the lower shaft 10. The recesses 313 are formed in the body 311 radially.

Figure 7:
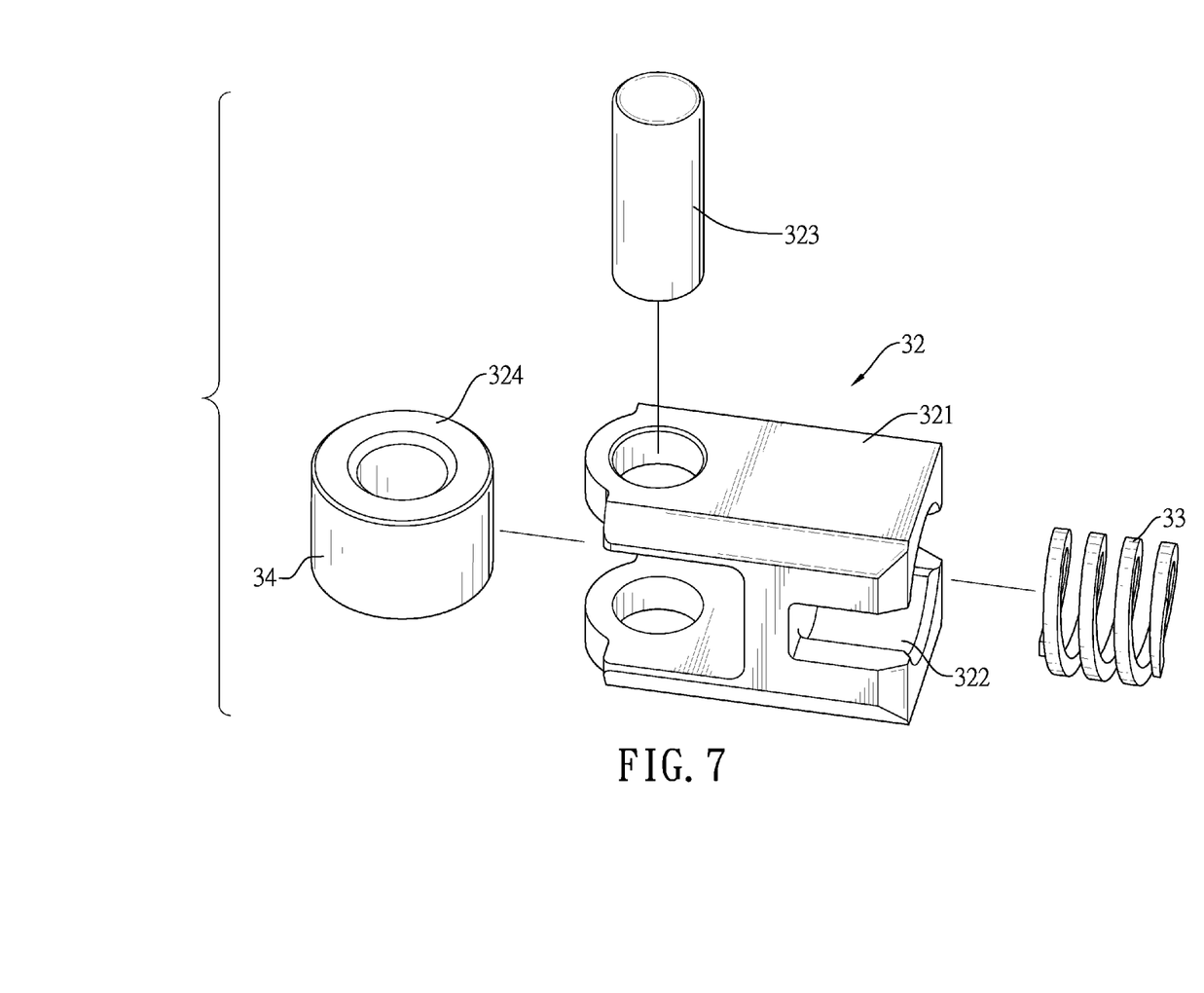
FIG. 7 is an enlarged exploded perspective view of a sliding block and a spring of the electrical power assisted steering device of FIG. 1.

The sliding blocks 32 are respectively and slidably mounted in the recesses 313. Each sliding block 32 has an abutting portion 34 formed on a side of the sliding block 32. The abutting portions 34 respectively abut the pushing portions 23. Preferably, each sliding block 32 has a block body 321, a guiding recess 322, a pin 323 and a mounting body 324. The guiding recess 322 is formed in an end of the block body 321 at a position opposite to the upper shaft 21. With reference to FIG. 7, the mounting body 324 is mounted around the pin 323 to form a cylinder, and the pin 323 and the mounting body 324 are mounted on another end of the block body 321 at a position opposite to the guiding recess 322. The cylinders formed by the mounting bodies 324 and the pins 323 respectively abut the pushing portions 23. Preferably, the abutting portion 34 is formed on a side of the mounting body 324.

The springs 33 are respectively mounted in the recesses 313 and the guiding recess 322. Each spring 33 abuts between the guiding recess 322 of the block body 321 and an interior of the body 311.

With reference to FIGS. 1 and 2, the torsion bar 40 is connected between the upper shaft 21 and the lower shaft 10. Preferably, the torsion bar 40 is connected with the upper shaft 21 and the lower shaft 10 by two fixing units 41, wherein one of the fixing units 41 is inserted through the upper shaft 21 and the torsion bar 40, and the other fixing unit 41 is inserted through the lower shaft 10 and the torsion bar 40.

With reference to FIG. 8, in assembling, the sensing module 60 is mounted around the lower shaft 10 in an initial position. The detecting unit 22 is combined with the upper rotor of the sensing module 60. The position of the detecting unit 22 relative to the upper shaft 21 can be adjusted via the first adjusting portions 24 and the second adjusting portions 25, such that assembling tolerance and manufacturing tolerance can be eliminated. The combining units 28 fix the detecting unit 22 on the adjusting board 27. After the sensing module 60 is assembled, the sensing module 60 is still at the initial position, such that the sensing module 60 can work accurately.

Figure 9:
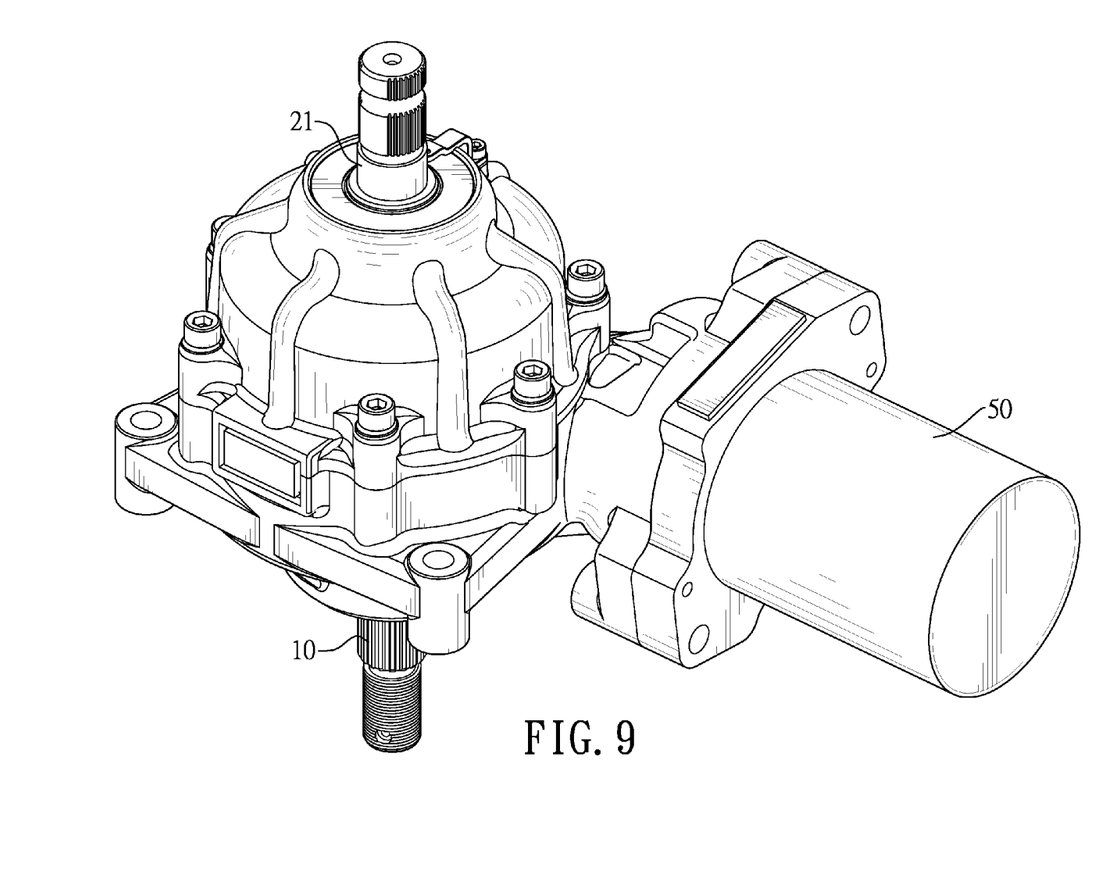
FIG. 9 is an enlarged perspective view of the electrical power assisted steering device mounted on the sensing module and the motor of FIG. 8.
Figure 10:
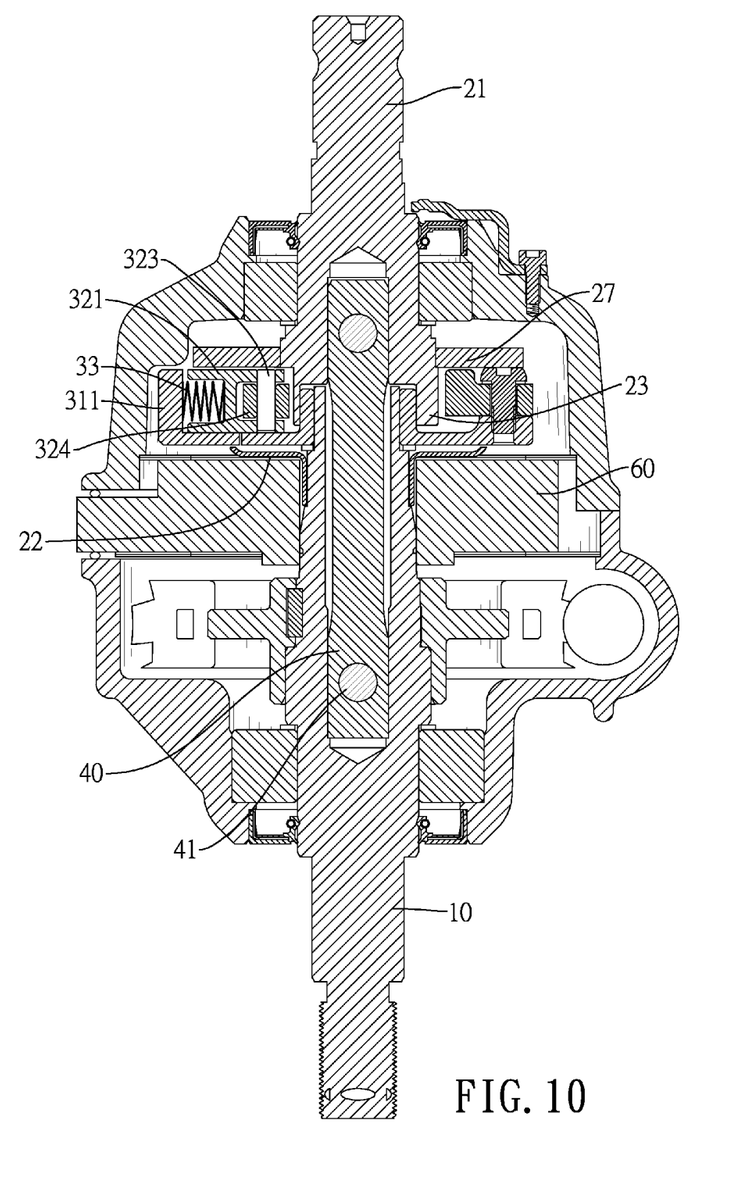
FIG. 10 is a cross sectional side view of the electrical power assisted steering device mounted on the sensing module and the motor of FIG. 8.

With reference to FIGS. 8 to 10, in use, the electrical power assisted steering device is mounted on the sensing module 60 and a driving motor 50. When a user rotates the steering wheel of the vehicle to drive the electrical power assisted steering device, the sensing module 60 can sense a steering movement of the vehicle. Then, the driving motor 50 can be driven to drive the lower shaft 10 and the upper shaft 21 to rotate in the same direction. Therefore, the user can rotate the steering wheel effortlessly.

Figure 3:
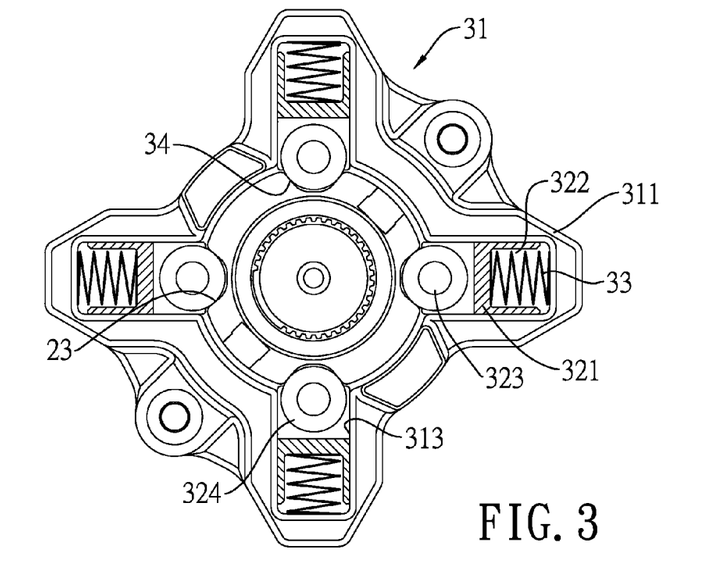
FIG. 3 is an enlarged top view in partial section of partial components of the electrical power assisted steering device of FIG. 1.

With reference to FIG. 3, before the steering wheel is rotated by the user, the abutting portions 34 of the sliding blocks 32 respectively abut the pushing portions 23 by elastic forces of the springs 33 to form an initial torque, such that the pre-torsion module 30 is forced by the initial torque by the springs 33 to be engaged at an initial position. When the steering wheel is slightly forced, the pre-torsion module 30 is forced by a torque. When the torque is less than the initial torque, the abutting portions 34 cannot be slid relative to the pushing portions 23, such that the steering wheel can be kept from arbitrary rotation. Therefore, the electrical power assisted steering device can be kept from working inadvertently.

Figure 4:
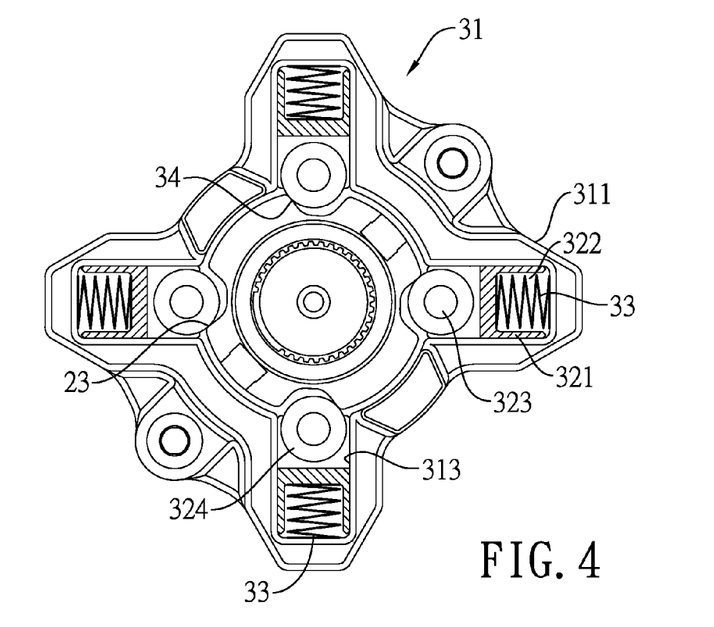
FIG. 4 is an enlarged operational top view in partial section of partial components of the electrical power assisted steering device of FIG. 1.
Figure 5:
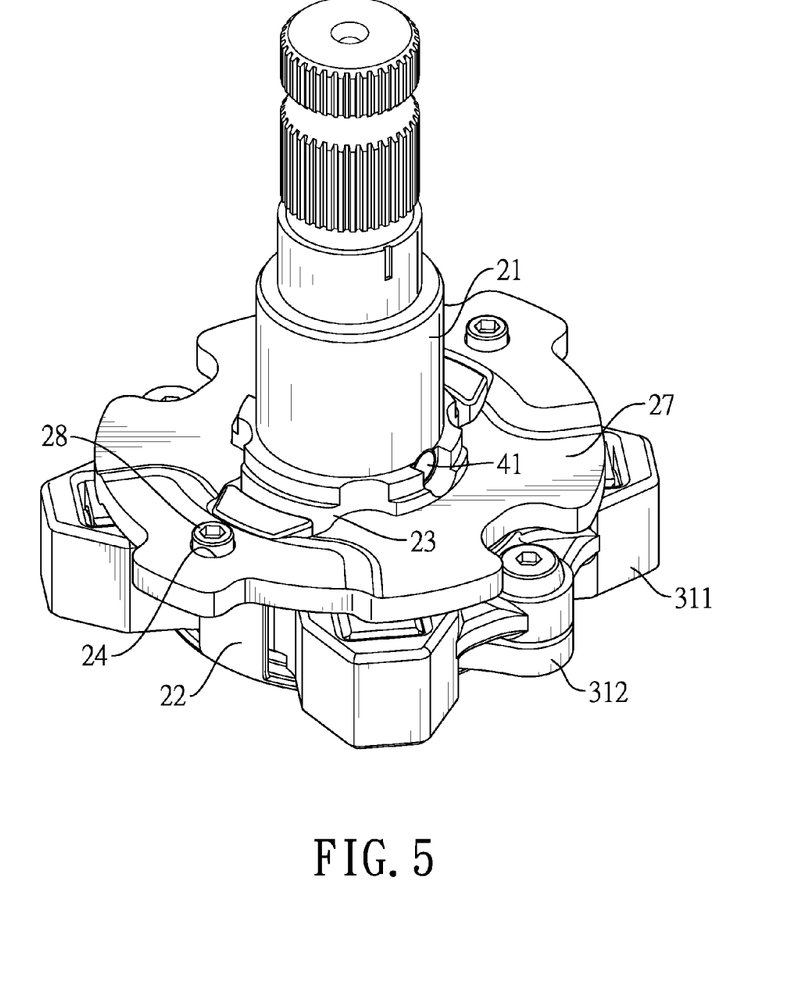
FIG. 5 is an enlarged perspective view of partial components of the electrical power assisted steering device of FIG. 1.

With reference to FIG. 4, when the torque forcing on the pre-torsion module 30 is larger than the initial torque, the abutting portions 34 can be slid relative to the pushing portions 23, and the pushing portions 23 can respectively push the sliding blocks 32. The sliding blocks 32 can be respectively moved toward the recesses 313 to compress the springs 33.

Further, the adjusting board 27 is rotated since the adjusting board 27 is engaged around the upper shaft 21, and then the adjusting board 27 drives the detecting unit 22 to rotate. When the detecting unit 22 is rotated, the upper rotor of the sensing module 60 is driven to rotate. The lower shaft 10 is not rotated, so an angle difference is formed between the upper rotor and the lower rotor. Therefore, the detecting unit 22 can detect a start of the steering movement of the vehicle. Then, the pre-torsion module 30 is driven to rotate by the detecting unit 22, and the vehicle can steer smoothly. Wherein, the driving motor 50 can assist the lower shaft 10 and the upper shaft 21 to rotate in the same direction to provide an assist for the steering movement of the vehicle.

From the above description, it is noted that the present invention has the following advantages: in assembling, the detecting unit 22 is engaged with the upper rotor of the sensing module 60. The second adjusting portions 25 and the first adjusting portions 24 provide a rotatable margin for the detecting unit 22, such that the detecting unit 22 can be rotated slightly relative to the upper shaft 21. After assembly, the sensing module 60 can be maintained in the initial position. Therefore, the assembling tolerance and the manufacturing tolerance can be eliminated effectively, and the detecting unit 22 can work accurately to provide assistance for steering.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical power assisted steering device mounted in a vehicle and having:
   a sensing module having an upper rotor and a lower rotor mounted under the upper rotor;
   a lower shaft engaged with the lower rotor;
   an upper shaft module mounted above the lower shaft and having
      an upper shaft;
      a detecting unit mounted around the upper shaft and engaged with the upper rotor of the sensing module;
      multiple pushing portions formed in the upper shaft; and an assembling space annularly formed between the detecting unit and the pushing portions;

a pre-torsion module mounted in the assembling space and having
- a maintaining unit mounted around the upper shaft and in the assembling space;
- multiple sliding blocks mounted in the maintaining unit and respectively abutting the pushing portions; and
- multiple springs mounted in the maintaining unit and respectively abutting between the maintaining unit and the sliding blocks; and a torsion bar connected between the upper shaft and the lower shaft.

2. The electrical power assisted steering device as claimed in claim 1, wherein the upper shaft module further has
- multiple first adjusting portions formed in the upper shaft; and
- multiple second adjusting portions formed in the detecting unit and respectively aligned with the first adjusting portions, wherein the detecting unit is rotatably mounted around the upper shaft to allow the detecting unit to rotate slightly relative to the upper shaft via the first adjusting portions and the second adjusting portions.

3. The electrical power assisted steering device as claimed in claim 2, wherein the upper shaft module further has an adjusting board engaged around the upper shaft, the first adjusting portions are formed in the adjusting board, and the pushing portions are adjacent to a bottom of the upper shaft and are located below the first adjusting portions.

4. The electrical power assisted steering device as claimed in claim 3, wherein the pre-torsion module is located between the pushing portions and the detecting unit, and between the adjusting board and the detecting unit.

5. The electrical power assisted steering device as claimed in claim 2, wherein
- the first adjusting portions are circular holes;
- the second adjusting portions are curved holes; and
- the upper shaft module further has multiple combining units respectively inserted through and combined with the first adjusting portions and the second adjusting portions.

6. The electrical power assisted steering device as claimed in claim 2, wherein
- the first adjusting portions are curved holes;
- the second adjusting portions are circular holes; and
- the upper shaft module further has multiple combining units respectively inserted through and combined with the first adjusting portions and the second adjusting portions.

7. The electrical power assisted steering device as claimed in claim 1, wherein the maintaining unit has
- a body being annular;
- a base mounted on a bottom of the body and mounted around a top of the lower shaft;
- multiple recesses formed in the body radially; wherein the sliding blocks and the springs are respectively mounted in the recesses, wherein the springs respectively abut between the recesses of the maintaining unit and the sliding blocks.

8. The electrical power assisted steering device as claimed in claim 7, wherein each sliding block has
- a block body;
- a guiding recess formed in an end of the block body at a position opposite to the upper shaft;
- a pin; and
- a mounting body mounted around the pin, wherein the pin and the mounting body are mounted on another end of the block body at a position opposite to the guiding recess, and the mounting body abuts the upper shaft.

* * * * *